June 20, 1933.  F. T. SWEIGART  1,915,107
FAN BELT PULLEY
Filed Feb. 2, 1932

INVENTOR
Frank T. Sweigart,
BY
HIS ATTORNEYS

Patented June 20, 1933

1,915,107

UNITED STATES PATENT OFFICE

FRANK T. SWEIGART, OF PORT WASHINGTON, NEW YORK, ASSIGNOR TO INTERNATIONAL MOTOR COMPANY, OF NEW YORK, N. Y., A CORPORATION OF DELAWARE

FAN BELT PULLEY

Application filed February 2, 1932. Serial No. 590,356.

The present invention relates to pulleys and embodies, more specifically, an improved pulley which is adapted to adjust itself automatically to changes in belt tension. The invention is particularly well suited for use in connection with fan belts for motor vehicles, wherein it is particularly desirable to accommodate the variations in length or tension of the belt during the life thereof, without requiring the continual adjustment of the pulley mechanism manually. Although the invention is described as particularly well suited for use in connection with fan belts, it will be readily apparent that this use is only one of a great number.

An object of the invention is to provide a pulley construction whereby automatic adjustment of the pulley is obtained to compensate for variations of length and tension in the belt.

A further object of the invention is to provide a pulley of the above character wherein cooperating tapered faces are formed, one of the faces being relatively movable with respect to the other, and means is provided for varying the relative positions of the surfaces automatically in accordance with the tension of the belt between such surfaces.

Further objects, not specifically enumerated above, will be apparent as the invention is described in greater detail in connection with the accompanying drawing, wherein.

Figure 1:
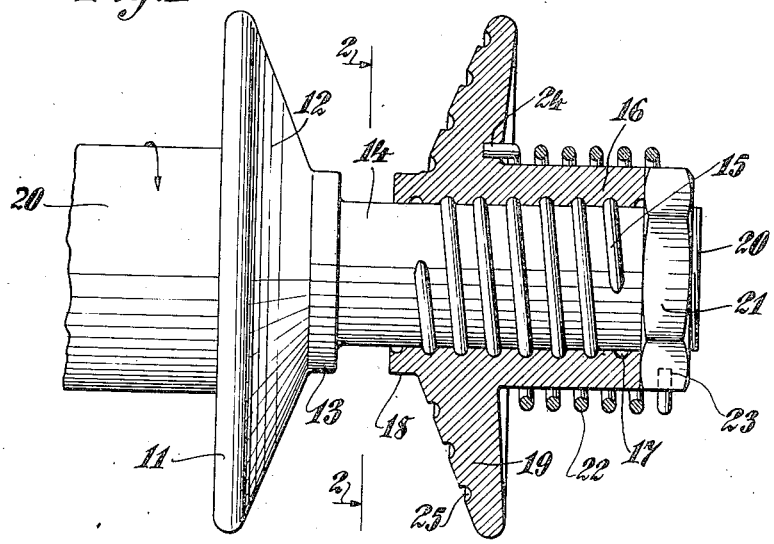
Figure 1 is a view in side elevation, partly broken away and in section, showing a pulley constructed in accordance with the present invention.

Referring to the above drawing, a shaft 10 is shown as formed with a pulley section 11 having a tapered face 12. This face terminates in a cylindrical surface 13 which may be termed the bottom of the pulley groove.

Formed with or secured to the foregoing structure is a shaft 14 which is formed with a raised thread 15 and is adapted to mount a sleeve 16. The sleeve is formed with internal threads 17 which are adapted to engage the threads 15 and cause the sleeve to be advanced along the shaft 14 upon rotation thereof. Upon the end of the sleeve 16 adjacent the pulley section 12 is formed a cylindrical surface 18 which is concentric with the axis of shaft 14 and lies flush with the cylindrical surface 13. A pulley section 19 is formed on the sleeve 16 and cooperates with the pulley section 12 to provide a complete pulley, the section 19 being axially movable with respect to the section 12. In view of the threaded engagement between the sleeve 16 and shaft 14, the pulley sections are relatively rotatable and such movement takes place simultaneously with relative axial movement between these sections.

Figure 2:
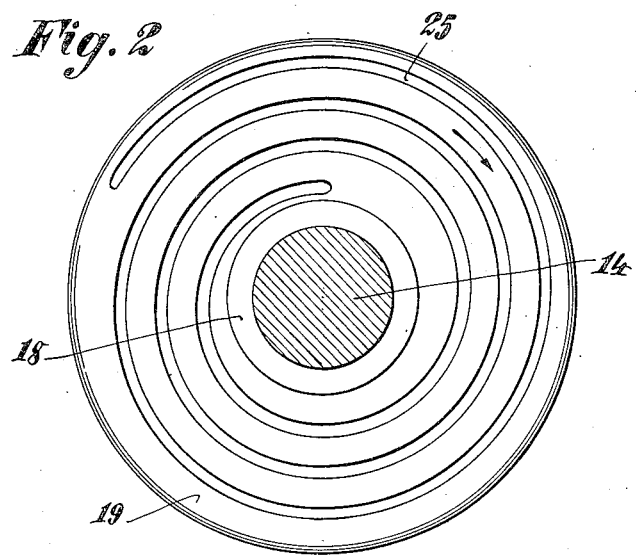
Figure 2 is a view in section, taken on line 2—2 of Figure 1, and looking in the direction of the arrows.

Upon the end of shaft 14, a threaded portion 20 is formed, a nut 21 serving to limit the movement of sleeve 16 away from the pulley section 12. A torsion spring 22 has one end thereof secured to the nut 21 as at 23 and the other end thereof secured to the pulley section 19 as at 24. In the tapering face of the pulley section 19, a spiral groove 25 is formed, as clearly shown in Figure 2.

In operation, it will be seen that the spiral groove produces a tendency of the belt to climb the pulley section 19. This tendency varies in accordance with the tension of the belt. If the belt tension is above a predetermined value, the tendency causes the section 19 to rotate sleeve 16 upon the shaft 14 and thus move the pulley section 19 axially with respect to the section 12. Correspondingly, if the tension falls below a predetermined value, the spring 22 (which normally resists movement of the sleeve 16 away from the pulley section 12) rotates the sleeve in the opposite direction and advances the pulley section 19 toward the pulley section 12.

In this manner, the pulley automatically finds its own adjustment in accordance with the character and condition of the belt during service. If, after long usage, the belt wears or elongates, the pulley automatically compensates for this condition and manual adjustment is not required.

While the invention has been described with specific reference to the accompanying drawing, it is not to be limited, save as defined in the appended claims.

I claim as my invention:

1. A pulley comprising a mounting means, a pulley section secured thereto, a cooperating pulley section carried rotatably thereby, said sections having tapering pulley surfaces, means to move the last named section axially with respect to the first section upon relative rotation therebetween, and means on the pulley surface of the movable section to afford a more effective gripping surface than on the face of the first section.

2. A pulley comprising a mounting means, a pulley section secured thereto, a cooperating pulley section carried rotatably thereby, said sections having tapering pulley surfaces, means to move the last named section axially with respect to the first section upon relative rotation therebetween, and a spiral groove on the pulley surface of the movable section.

3. A pulley comprising a mounting means, a pulley section secured thereto and having a tapering pulley face, a shaft on the section coaxial thereto, a sleeve on the shaft, said sleeve and shaft being formed with interengaging threaded portions, a pulley section on the sleeve having a tapering pulley face cooperating with the first section, a spiral groove in the face of the second named pulley section, and a coil spring on the sleeve secured to the shaft and sleeve to urge the pulley sections together.

This specification signed this 28 day of January A. D. 1932.

FRANK T. SWEIGART.